Oct. 21, 1941.  J. H. BURNSIDE, 2D  2,259,454
CIRCUIT BREAKER
Filed Jan. 15, 1938  3 Sheets-Sheet 1
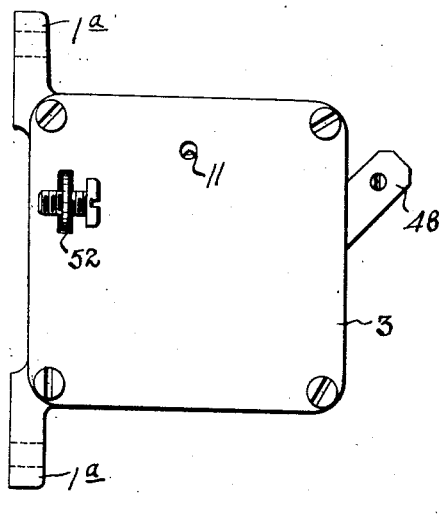
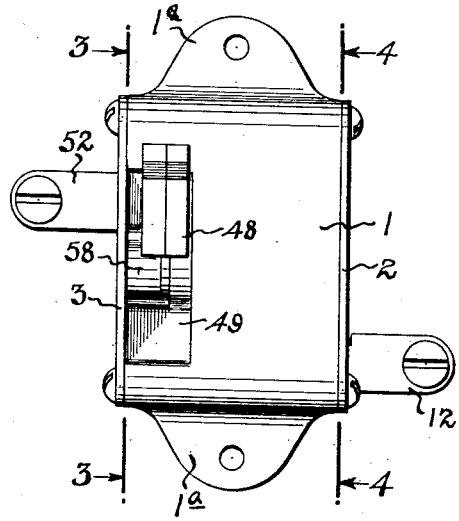
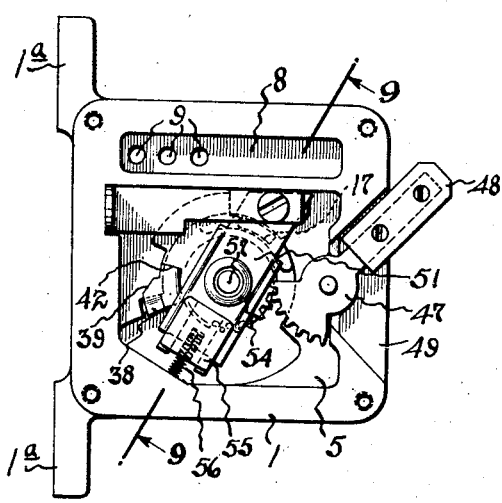
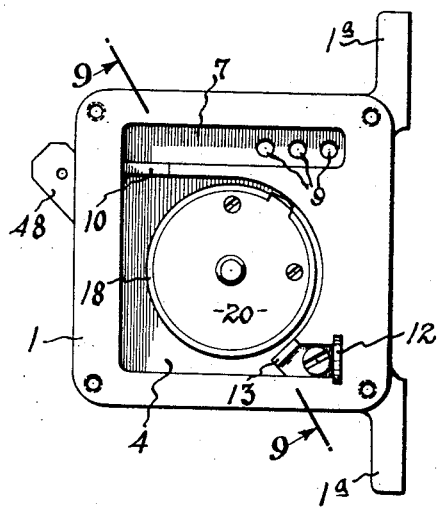
INVENTOR.
James H. Burnside 2nd.
BY
Darby & Darby.
his ATTORNEYS

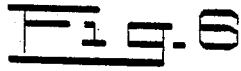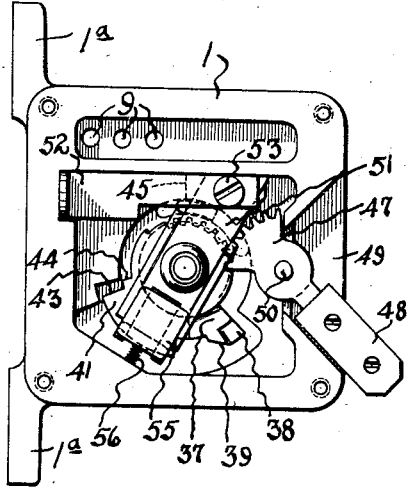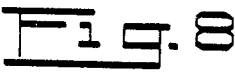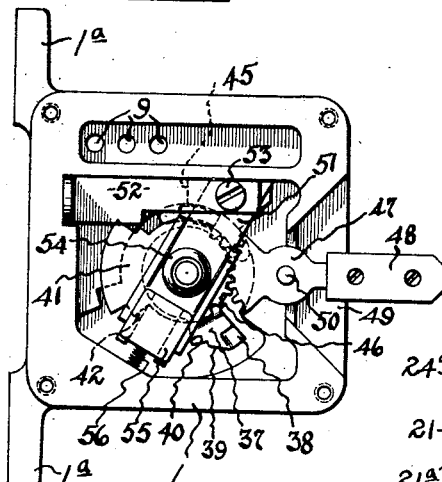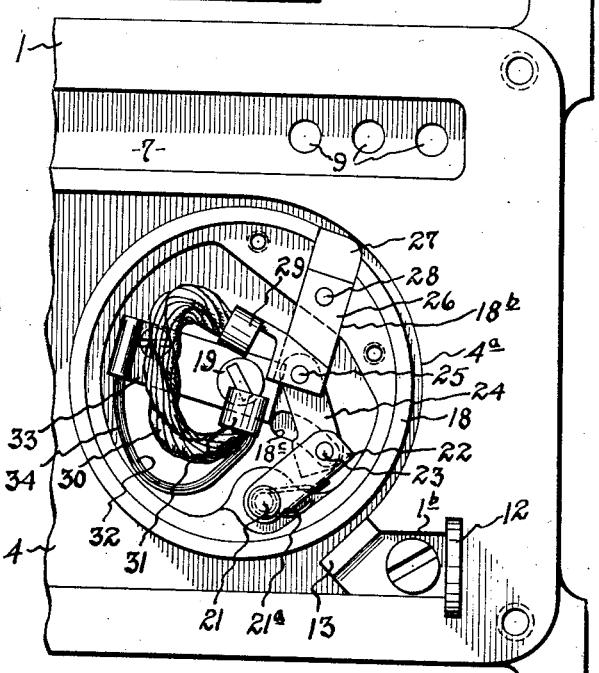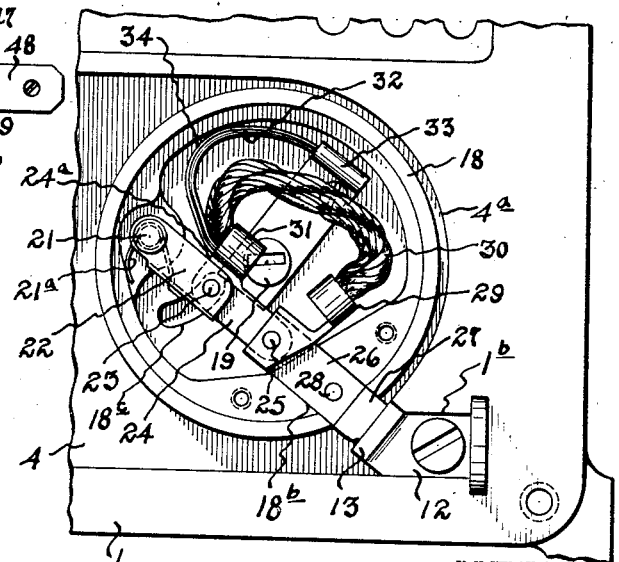

Oct. 21, 1941. J. H. BURNSIDE, 2D 2,259,454
CIRCUIT BREAKER
Filed Jan. 15, 1938 3 Sheets-Sheet 3
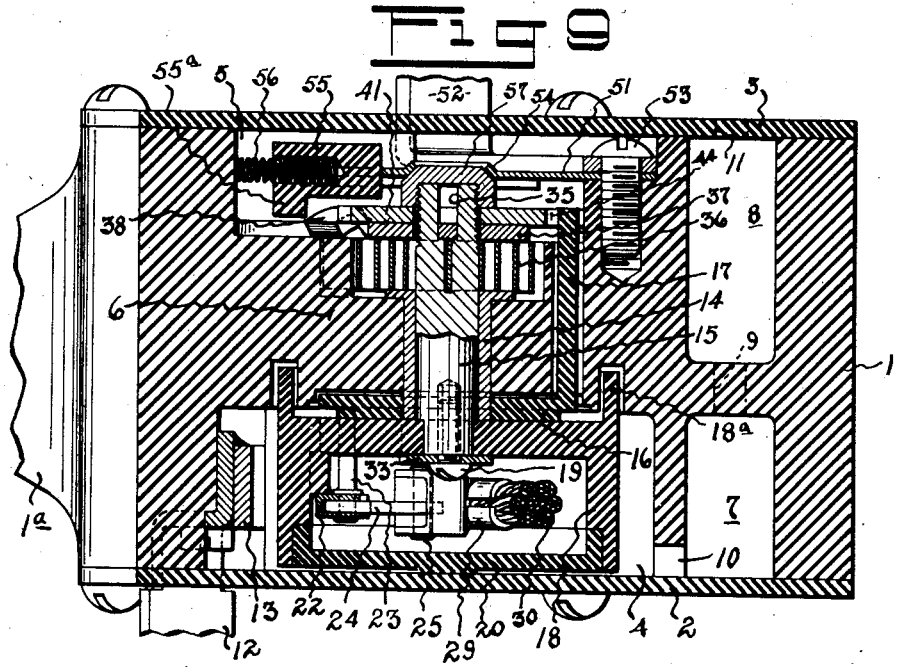
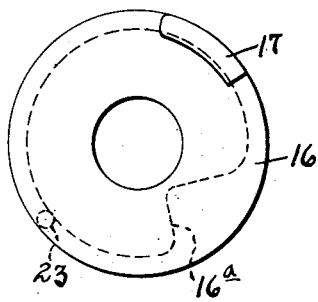
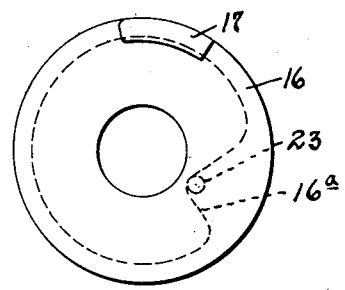
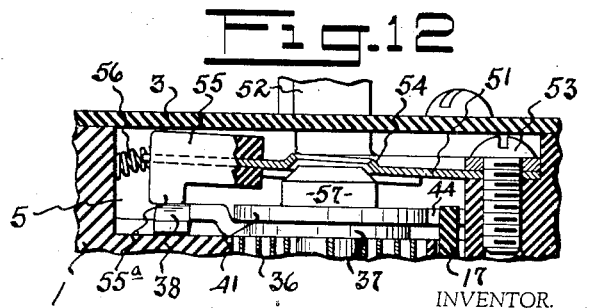
INVENTOR.
James H. Burnside 2nd.
BY
his ATTORNEYS Patented Oct. 21, 1941

2,259,454

UNITED STATES PATENT OFFICE 2,259,454

CIRCUIT BREAKER

James H. Burnside, II, New York, N. Y., assignor to Circuit Breakers, Inc., New York, N. Y., a corporation of New York Application January 15, 1938, Serial No. 185,145

31 Claims. (Cl. 200—116)

This invention is concerned with improvements in circuit breakers and switching devices of that nature wherein the objects of compactness, ruggedness, inexpensiveness of manufacture, ease of assembly and repair are successfully sought.

An object of this invention is to provide a unitary circuit breaker structure of the type employing a thermostatic element for releasing the breaker from an "on" position to an "off" position so as to break circuits connected thereto upon the development of an overload therein.

Another object of this invention is to provide in a circuit breaker of this type a construction which permits of the manual release thereof to break the circuit when desired.

Another object of this invention is to provide in a circuit breaker of this type a free tripping device so that the circuit breaker may not be held closed on an overload.

An important object of this invention is to provide in a relatively small structure of this type a mechanism capable of repeatedly breaking an overloaded circuit without damage thereto and so constructed as to minimize the danger of fires from the arc or flame occurring at the time of circuit opening.

A still further object of the invention is to provide a circuit breaker of this type in which the main contacts are moved into engagement at a time when they are not energized and to this end there is incorporated in the device an automatically acting secondary switch which disconnects one of the contacts of the circuit breaker from the circuit during the time that contact is being moved into engagement with the other circuit contact.

Another object of this invention is to provide in a circuit breaker a rotor on which one of the contacts is mounted for cooperation with the other contact which is fixed to hold the rotor in closed circuit position against the tendency of a continuously acting spring to move the rotor to open circuit position.

A more specific object of the invention is the provision in combination with the contact on the rotor of a toggle mechanism for ensuring the above result and a thermostatic or bimetal element for releasing the toggle and hence the rotor upon the development of an overload.

A further and important object of the invention is to provide a structure of this type in which the fixed and movable contacts are arranged for relative movement with respect to each other on an arcuate path which is relatively restricted and which is confined so as to tend to destroy the arc while confining it.

Another object of the invention is to provide a shunt for the thermostatic element in a device of this type whereby only a portion of the circuit current traverses the thermostatic element.

In addition to the above objects, many other and important objects are secured by means of this invention as will become apparent from the following disclosure.

This invention resides substantially in the combination, construction, arrangement and relative location of parts, all as will be described in greater detail hereafter.

In the accompanying drawings,

Figure 1 is a side elevational view of one form of structure in accordance with this invention;

Figure 2 is a front elevational view thereof;

Figure 3 is an elevational view similar to that of Figure 1, with the left hand cover removed, on the plane 3—3 of Figure 2;

Figure 4 is a view similar to Figure 3 from the other side with the right hand cover removed, on the plane 4—4 of Figure 2;

Figure 5 is an enlarged view similar to that of Figure 4, with some parts broken away, with the cover of the rotor removed showing the switch in open circuit position;

Figure 6 is a view similar to Figure 3 showing the switch operated to re-set position;

Figure 7 is a view similar to Figure 5 showing the switch in circuit closing position;

Figure 8 is a view similar to Figures 3 and 6 showing the switch in "on" or circuit closing position;

Figure 9 is a cross-sectional view taken on the line 9—9 of Figures 3 and 4;

Figure 10 is a top plan view of the member for releasing the toggle connected to the movable contact showing the cam thereon in releasing position with respect to the cam follower which is a part of the toggle mechanism;

Figure 11 is a view similar to Figure 10 showing the cam follower in locking position; and Figure 12 is a detail cross-sectional view taken on the line 9—9 of Figure 3.

Although not limited to such use, the circuit breaker of this invention has been devised for use in the home in the ordinary house lighting circuits with the object of replacing the fuses now commonly used therein and providing as a substitute therefor an overload safety device which, upon actuation to open the circuit, may be re-set to close it and provide the same protection therefor as initially. In accordance with the standard requirements for a device of this type which must be met, it is provided with a construction which permits of manual operation thereof by means of an actuating lever while preventing the operator from holding that lever in a position to hold the circuit closed in the event that the overload on the circuit has not been removed.

The full scope and nature of the invention can best be described after a detailed reference to the parts comprising it and their operative association with each other. As indicated in the drawings, the device involves a casing or housing 1 provided with suitable mounting feet 1a constructed preferably as an integral piece of any suitable insulating material and in any manner well known in the art. The main body 1 is generally rectangular in form and has flat sides to which are applied the cover plates 2 and 3, likewise and preferably of insulating material, by means of screws or the like. The main body of the housing is formed so as to provide two separated chambers or compartments 4 and 5 separated because of the intermediate wall 6, see Figure 9. In addition, the casing is provided with two smaller compartments or spaces 7 and 8 separated by a wall having a series of apertures 9 therethrough. The chambers 7 and 8, in addition to being isolated from each other, are respectively isolated from both of the chambers 4 and 5, with the exception that communication between chambers 4 and 7 is provided through a restricted opening 10. As is clear from Figure 9, the chamber 8 opens to the atmosphere exteriorly of the housing through a port 11.

Set in a recess 1b, see Figures 5 and 7, in the housing is a connector 12 secured therein as shown and provided with a contact 13 of any metal suitable as a contact material. As is clear from these figures, the chamber 4 is provided at at least one end with an arcuate or longitudinally curved defining wall 4a which is arranged to be a continuation of the outer face of the contact 13. It will be seen from Figures 5 and 7 that the face of the contact 13 is not, however, in the same surface of revolution as the curved wall 4a but is tipped outwardly a bit so that the plane of the face of the contact 13 is at right angles to the path of longitudinal movement of arm 26 and contact 27. The connector 12 is arranged to project through an aperture in the cover 2 to provide means for connecting one of the circuit wires to the device.

In the wall 6 and extending through it is a bushing or bearing member 14, see Figure 9, in which is journaled a stud shaft 15. One end of the bushing 14 is flanged to rest on the bottom wall of a smaller chamber opening into the chamber 5 while the other end projects into a shallow recess on the other side of the wall 6 opening into chamber 4. Journaled on the projecting end of bushing 14 is a disc 16 of suitable insulating material having a camming surface 16a formed on the outer face thereof. Integral with the disc and extending at right angles therefrom on the opposite side from the cam is an arm 17 which extends through a passage in the wall 6 parallel to the bushing 14 so as to project into chamber 5.

Mounted on one end of the shaft 15 is a rotor 18 of substantially cylindrical form and recessed to form a chamber which is closed by means of a removable cover 20. The rotor is secured to the shaft 15 for rotation with it by means of a screw 19. The rotor and cover are preferably formed of insulating material.

Referring now to Figures 5 and 7, there is shown mounted on the interior of the rotor on a pivot pin 21 a U-shaped lever 22, see Figure 9, and a spring 21a having one end resting against the interior wall of the rotor and the other end engaging the lever 22. Pivotally connected to lever 22 by means of a pivot pin 23 is a link 24 which has a radial projection 24a, to be referred to later. In turn, there is pivotally connected by means of the pivot pin 25 to the link 24 a contact supporting arm 26 to which is riveted the contact 27, as indicated at 28. The arm 26 is slidably mounted in a groove in the rotor, as shown at 18b, which groove is closed by the cover 20 when applied to the rotor forming a tunnel or passage in which the arm 26 may reciprocate in the direction of its length. The contact 27 is made of a material suitable for this purpose and is arranged when the circuit breaker is in closed position to engage the fixed contact 13.

The arm 26 is provided with a transversely extending connector 29 to which a flexible conducting pigtail 30 is secured, the other end of which is secured to a connector 31 mounted on the end of a thermostatic or bimetal element 32. The other end of the bimetal element 32 is connected to a conducting strip 33 which extends under the head of the screw 19 and is secured in place by it. At 34 is the conductive shunt for the bimetal element 32 extending from the connector 31 to the strip 33. This shunt may be formed in several ways. It may simply consist of a strip of metal of the proper current carrying capacity independent of the bimetal element or it may consist of a conductive coating on the bimetal element formed either by plating it directly thereon, by welding or soldering it thereto or otherwise securing it in place so that the bimetal element carries but a portion of the current. It will be seen that the connector 31 is positioned so as to engage the cam 24a on the lever 24 when the toggle mechanism formed by the levers 22, 24 and 26 is in locking position. As is clear from Figures 7 and 9, the pivot pin 23 extends through an arcuate slot 18c in the base of the rotor so as to lie adjacent the camming surface 16a. When the toggle is in the position shown in Figure 7 the pin 23 lies in the valley of the cam 16a, as is shown in Figure 11. When the toggle is broken down, as shown in Figure 5, the pin 23 with respect to the cam 16a is in the position shown in Figure 10.

As is clear in Figure 9, the wall 6 is provided with a circular groove in which lies a skirt 18a extending from the rotor. This construction increases the length of the path between the pivot pin 23 and the other live parts of the switch, thereby increasing the arcing distance and preventing arcing therebetween at the time of circuit interruption.

As can be seen from Figure 9, the other end of the shaft 15 is provided with an axial slot 35 having portions of different width. The end of a spring 36 is mounted in the narrower portion, the other end of which spring is mounted in a slot in the wall 6, see Figure 9. When in place this spring is tensioned so as to rotate the rotor in a counter-clockwise direction from "on" to "off" position when viewed from the side shown in Figures 5 and 7. On the end of the shaft and the outer face of the spring 36 is a small disc 37, preferably of metal, having a radially extending ear which is offset out of the plane of the disc in a direction away from the spring, Figure 9. The radial ear is provided with a cam surface 38 resulting from slitting the metal and bending the ear thus formed back down towards the plane of the disc 37. In back of the cam 38 is a cam 39 formed by inclining the edge of the radial ear, and still further in back thereof, see Figure 8, is a shoulder 40 for a purpose about to be described. The disc 37 is provided with a circular opening to fit over the end of the shaft 15 having a diametrically extending rib which fits in the enlarged portion of the slot 35. Thus the disc must rotate with the shaft. Also mounted on the end of the shaft and outside of the disc 36 is a disc or gear member 41 which is flat and has a radial extension, as shown in Figure 8, having a shoulder 42 for cooperation with the shoulder 40 on the radial arm of disc 37. The extension also has shoulders 43 and 44, see Figure 6.

The shoulder 43 is arranged to engage a stop 45 formed in the housing 1 while the shoulder 44 is arranged to engage the end of the axially extending arm 17 of the disc 16, see Figures 3, 9 and 12. One edge of the member 41 is provided with gear teeth 46, see Figure 8, which mesh with similar teeth on the manually operated lever 47. This lever is journaled on a pin or shaft 50 mounted in the housing 1 and is provided with a finger grip 48. The manual lever extends through an opening 49 in the housing, as is clear from the various figures. As shown in Figure 2, the cover 3 is either provided with an integral member 58 which slips over the pin 50 and closes the bottom of the opening 49 or this member 58 is provided separately as a cylindrical piece which lies in the opening and on the pin 50, as is clear from the figures. This serves to close the structure to prevent any danger of fire by the escape of burning gases and to keep dirt and the like out of the casing.

At 51 is a spring strip which together with a connector 52 is mounted on the casing and firmly fixed thereon by means of a screw 53. The connector 52 is arranged to project through an opening in the cover 3, see Figure 1, and provides the other terminal of the circuit breaker for connection to the circuit. This spring arm 51, which is in the form of a substantially flat spring, has an aperture in it, the defining edge of which is pressed out of the plane of the strip to form an annular contact 54, the inner face of which extends at about an angle of 45° with the plane of the strip. This contact member is arranged to lie over another contact member 57 which is shaped on its outer surface to mate with the contact 54. The contact member 57 is in the form of a cap nut which screws on the end of the shaft 15, see Figure 9, to lock the shaft in place with all of its associated parts. It also serves to lock the member 41 on the shaft while permitting relative movement between that member and the shaft.

On the free end of the spring strip 51 is slidably mounted a block 55 of insulating material which is normally held at its inward radial position with respect to the axis of the shaft by means of a spring 56, as shown in Figure 8. Projecting downwardly from the block 55, as is clear from Figures 9 and 12, is a camming member 55a arranged to cooperate with the arms or extensions 38 and 41 in a manner to be explained later.

The operation of this structure will now be given in full detail. The position of the circuit breaker, as indicated in Figures 1 and 2, represents the preferred but not required operating position thereof. The grip 48 of the manually operated lever 47 is thus exposed for the operation of the device. In Figures 1 to 4, inclusive, it is shown in the "off" position, at which time the circuit breaker is open. In Figure 6 it is shown in the re-set position, at which time the circuit breaker has been closed although the circuit is not yet completed because the switch at the contacts 54 and 57, see Figure 12, is open. However, the movement of the operating lever from the position shown in Figure 1 to that shown in Figure 6 moves the contact 27 from the position shown in Figure 5 to the position shown in Figure 7. However, just prior to the assumption by the contact 27 of the position shown in Figure 7, namely, when the lever 47 is forced to the position shown in Figure 6, rotor 18 is a little further around in a clockwise direction, Figure 7, although in engagement with fixed contact 13. However, as soon as the pressure is released on the manual lever it assumes the exact position shown in Figure 7. The manual lever is then moved from the re-set position of Figure 6 back to the "on" position shown in Figure 8. This movement does not disturb the rotor 18 which remains in the position shown in Figure 7 although it does move the member 41 from the position shown in Figure 6 to the position shown in Figure 8.

When the manual lever is moved from the position shown in Figures 1 and 3 the teeth thereon in engagement with the teeth 46 on the member 41 causes the member 41 to move in a counterclockwise direction from the position in Figure 3. At the position in Figure 3 it will be seen that the shoulder 40 on the disc 37 engages the shoulder 42 on the member 41. Thus, as the member 41 is operated in a counterclockwise direction, Figure 3, by the lever it carries with it the disc 37, which conjoint movement continues until these parts get to the position shown in Figure 6. The movement of the disc 37 in this manner carries with it the shaft 15 and the rotor 18, as well as all of the parts connected thereto, so that spring 36 is put under tension and the rotor is moved from the position shown in Figure 5 to that shown in Figure 7. By the time the parts reach the position shown in Figure 6 the pin 23 has moved opposite the valley of the cam 16a and is caused to drop into it because the spring 21a, Figure 7, straightens the toggle mechanism so that its parts are aligned as shown in Figure 7.

As the radial ear of disc 37 moves under the projection 55a on the block 55 the inclined cam 38 raises the block and springs the arm 51 upwardly so as to break the circuit between the contacts 54 and 57. The block 55 then rides on top of the radial ear and the member 41 during full movement to re-set position, keeping the circuit open at the contacts 57 and 54 at the time when it is being completed between the contacts 13 and 27. As the operating lever is moved back to "on" position the member 41 is rotated in a clockwise direction, see Figure 8, from the position in Figure 6 to the position in Figure 8 leaving behind, however, the radial ear of disc 37 and leaving the shaft and rotor in the position to which it has been moved as shown in Figure 7. As the member 41 moves out from under the cam extension 55a, the block 55 moves down as the flat spring 51 is released so that it moves back to re-engage contacts 54 and 57. At this time the circuit through the device is entirely completed. This circuit involves a path from one wire through connector 52, spring 51, contact 54, contact 57, shaft 15, connector strip 33, bimetal element 32, connector 31, pigtail 30, connector 29, arm 26, movable contact 27, fixed contact 13, and connector 12, back to the other side of the circuit. Thus, the circuit current flows through the bimetal element proportioned, of course, in accordance with the relative conductivity of the shunt 34 in the bimetal element 32. For all loads for which the device is designed, the parts remain in the position shown in Figures 7 and 8. In the event of an overload, however, the bimetal element expands so that its free end moves radially with respect to the pin 23, moving the toggle linkage out of alignment and releasing the rotor which has been held in its actuated position by reason of the relative position of this linkage and the fixed contact.

Thus, as is clear from Figure 7, since the linkage is not radially aligned with respect to the axis of rotation of the rotor 18, the tendency of spring 36 to move the rotor in a counterclockwise direction is prevented. As explained, the arm 26 is squarely held in a tunnel formed by the rotor and its cover so that any tendency to move the rotor in a counterclockwise direction only the more tightly engages the contacts 27 and 13. However, when the toggle moves out of alignment the arm 26 may slide back enough so that the rotor may snap in a counterclockwise direction under the urgence of spring 13 almost instantaneously to the position shown in Figure 5. In other words, the retraction of the arm 26 removes the locking engagement between contacts 27 and 13 so that the rotor is free to move. As is shown in Figure 7, the trailing corner of the contact 27 with respect to its opening movement is slightly rounded to facilitate this movement. The contact 27 wipes along the curved wall 4a and any arc that forms must form in the restricted longitudinally curved channel between the outer faces of the rotor 18 and the longitudinally curved wall 4a. The hot and burning gases expand into the chamber 4 and from there through the opening 10 into the chamber 7 and from there through the holes 9 into chamber 8 and are then vented through the port 11 to the atmosphere. By the time these gases reach the atmosphere their temperature has been sufficiently reduced so that they are no longer a source of danger in case of fire.

In the event that it is desired to manually open the circuit the lever 47 is moved from the "on" position, Figure 8, to the "off" position, Figure 3. As it is moved to this position the member 41 swings in a clockwise direction until the shoulder 44 engages the extension 17 on the disc 16. This occurs before the shoulder 43 engages the stop 45. Final movement of the member 41 by the lever, therefore, causes movement of the camming surface 16a a sufficient amount so that the pin 23 moves from the position shown in Figure 11. The camming surface 16a causes this movement of the pin against the spring 21a so as to finally break the toggle down to the position shown in Figure 5 when the rotor is again released so that it may snap in a counterclockwise direction, Figure 7, to "off" position. The direction of rotation of the rotor to "off" position carries the cam back to its previous position because of the frictional engagement between the two.

It will be seen that the switch may not be held closed on a short circuit or overload because when the operating lever is in the re-set position, Figure 6, at which time contacts 27 and 13 engage, the circuit is not completed because contacts 54 and 57 are not engaged. As soon however, as the lever is moved back to "on" position so that contacts 54 and 57 do engage, the rotor is free because shoulder 42 on the member 41 has moved away from the shoulder 40 on the disc 37. Thus the bimetal element can again trip the device to open the circuit.

On all return movements of the disc 37 from closed circuit position to open circuit position, the camming surface 39, Figure 8, engages the inner face of the cam follower 55a so as to slide the block 55 outwardly on the end of spring 51 against spring 56. As soon as the arm moves past the cam follower 55a, spring 56 snaps the block back to normal position as shown in the various figures. This construction permits of the construction and operation of the disc 37 as explained without causing disengagement of contacts 54 and 57 at a time when contacts 27 and 13 are engaged. In other words, the circuit is never broken at contacts 54 and 57 when they are alive. Thus they need not be of a special contact material or specially constructed to withstand pitting and burning resulting from the breaking of a live circuit. This likewise is important since it keeps the flame and explosion effects away from this part of the apparatus since they must always occur on the other side of the wall 6. It is noted at this point that the wall 6 separates many of the operating parts from the chamber in which the arcing occurs, thereby protecting all the parts in chamber 5 and particularly the operating spring 36. On the opening stroke of the device the opening movement of the parts is limited by the engagement of shoulder 43 with the stop 45 as previously explained.

From the above description it will be apparent to those skilled in the art that the novel features of construction and operation embodied in the form of structure illustrated in the drawings for the purpose of explaining this invention may be readily varied without departure from the novel scope of the subject matter herein disclosed. I do not, therefore, desire to be strictly limited to this disclosure but prefer, rather, that the scope of this patent be defined by the claims granted me.

What I seek to secure by Letters Patent is:

1. In a circuit breaker, a housing having an inner arcuate wall, a fixed contact secured on said wall having a face lying at an angle to the tangent of the wall at that point, a member journaled in said housing, a contact on said member having a face to engage with said face of the fixed contact, and means in the housing for urging said member to contact disengaging position, said contacts when in engagement locking said member against contact disengaging movement by reason of the said position of the fixed contact.

2. In a circuit breaker, a housing having an inner arcuate wall, a fixed contact secured on said wall having a face lying at an angle to the tangent of the wall at that point, a member journaled in said housing, a contact on said member having a face to engage with said face of the fixed contact, means in the housing for urging said member to contact disengaging position, said contacts when in engagement locking said member against contact disengaging movement by reason of the said position of the fixed contact, and means for moving one of the contacts relative to the other upon the development of an overload in a circuit to which the breaker is connected whereby said member is moved to contact disengaging position.

3. In a circuit breaker, a housing having an inner arcuate wall, a fixed contact secured on said wall having a face lying at an angle to the tangent of the wall at that point, a member journaled in said housing, a contact on said member having a face to engage with said face of the fixed contact, means in the housing for urging said member to contact disengaging position, said contacts when in engagement locking said member against contact disengaging movement by reason of the said position of the fixed contact, and thermo-responsive means for moving one of the contacts relative to the other whereby said member is moved to contact disengaging position.

4. In a circuit breaker, a housing having an inner arcuate wall, a fixed contact secured on said wall having a face lying at an angle to the tangent of the wall at that point, a member journaled in said housing, a contact on said member having a face to engage with said face of the fixed contact, means in the housing for urging said member to contact disengaging position, said contacts when in engagement locking said member against contact disengaging movement by reason of the said position of the fixed contact, and means mounted on said member for moving the contact thereon relative to the fixed contact upon the development of an overload in a circuit to which the breaker is connected whereby said member moves to contact disengaging position.

5. In a circuit breaker, a housing having an inner arcuate wall, a fixed contact secured on said wall having a face lying at an angle to the tangent of the wall at that point, a member journalled in said housing, a contact on said member having a face to engage with said face of the fixed contact, means in the housing for urging said member to contact disengaging position, said contacts when in engagement locking said member against contact disengaging movement by reason of the said position of the fixed contact, and thermo-responsive means mounted on said member for moving the contact thereon relative to the fixed contact upon the development of an overload in a circuit to which the breaker is connected whereby said member moves to contact disengaging position.

6. In a circuit breaker, a housing having an inner arcuate wall, a fixed contact secured on said wall so that its face lies at an angle to the tangent of the wall at that point, a substantially cylindrical member journaled in said housing close to said arcuate wall, a contact having an end face slidably mounted on said member and positioned so that its end face engages the face of the fixed contact, means for urging said member to contact disengaging position, and means to move said member to contact engaging position, said member being held in said contact engaging position by reason of the face to face engagement of said contacts.

7. In a circuit breaker, a housing having an inner arcuate wall, a fixed contact secured on said wall so that its face lies at an angle to the tangent of the wall at that point, a substantially cylindrical member journaled in said housing close to said arcuate wall, a contact having an end face slidably mounted on said member and positioned so that its end face engages the face of the fixed contact, means for urging said member to contact disengaging position, means to move said member to contact engaging position, said member being held in said contact engaging position by reason of the face to face engagement of said contacts, and means mounted in said member for causing the contact on said member to slide away from said fixed contact upon the development of an overload in a circuit to which the breaker is connected.

8. In a circuit breaker, a housing having an inner arcuate wall, a fixed contact secured on said wall so that its face lies at an angle to the tangent of the wall at that point, a substantially cylindrical member journaled in said housing close to said arcuate wall, a contact having an end face slidably mounted on said member and positioned so that its end face engages the face of the fixed contact, means for urging said member to contact disengaging position, means to move said member to contact engaging position, said member being held in said contact engaging position by reason of the face to face engagement of said contacts, and heat responsive means mounted in said member for causing the contact on said member to slide away from said fixed contact upon the development of an overload in a circuit to which the breaker is connected.

9. In a circuit breaker as described, a housing forming a chamber, an oscillatable member rotatably mounted in said chamber, a contact slidably mounted on said member and having a substantially plane end face, a contact fixed on the inner wall of said housing likewise having a substantially plane face, said contacts engaging face to face in circuit closed position, and means continuously urging said member to contact disengaging position, the plane of engagement of said contacts lying at an angle to the tangent of the arcuate path of movement of the contact on said member, whereby said member is locked in circuit closed position against disengaging movement by said means.

10. In a circuit breaker as described, a housing forming a chamber, an oscillatable member rotatably mounted in said chamber, a contact slidably mounted on said member and having a substantially plane end face, a contact fixed on the inner wall of said housing likewise having a substantially plane face, said contacts engaging face to face in circuit closed position, means continuously urging said member to contact disengaging position, the plane of engagement of said contacts lying at an angle to the tangent of the arcuate path of movement of the contact on said member, whereby said member is locked in circuit closed position against disengaging movement by said means, and means mounted in said member for moving the contact on said member along a path at right angles to the fixed contact to destroy the locking engagement therewith upon an overload.

11. In a circuit breaker as described, a housing forming a chamber, an oscillatable member rotatably mounted in said chamber, a contact slidably mounted on said member and having a substantially plane end face, a contact fixed on the inner wall of said housing likewise having a substantially plane face, said contacts engaging face to face in circuit closed position, means continuously urging said member to contact disengaging position, the plane of engagement of said contacts lying at an angle to the tangent of the arcuate path of movement of the contact on said member, whereby said member is locked in circuit closed position against disengaging movement by said means, and heat responsive means mounted in said member for moving the contact on said member along a path at right angles to the fixed contact to destroy the locking engagement therewith upon an overload.

12. In a circuit breaker of the type described, the combination including a housing, an oscillatable member journaled in said housing, a contact mounted on said member, said contact travelling in an arcuate path upon oscillation of said member, a contact mounted on the inner wall of said housing so as to be engaged by the contact of said member in circuit closed position, the surface of engagement between said contacts being offset from said arcuate path, means mounted on said member for withdrawing the contact thereon upon overload from engagement with the fixed contact, and means for urging said member from closed circuit position whereby said contacts cooperate under normal conditions to lock said member in closed circuit position.

13. In a circuit breaker of the type described, the combination including a housing, an oscillatable member journaled in said housing, a contact mounted on said member, said contact travelling in an arcuate path upon oscillation of said member, a contact mounted on the inner wall of said housing so as to be engaged by the contact on said member in circuit closed position, the surface of engagement between said contacts being offset from said arcuate path, thermostatic means mounted on said member for withdrawing the contact thereon upon overload from engagement with the fixed contact, and means for urging said member from closed circuit position whereby said contacts cooperate under normal conditions to lock said member in closed circuit position.

14. In a circuit breaker of the type described, the combination including a housing forming a chamber and a wall dividing said chamber into two compartments, a shaft journaled in said wall and projecting into each compartment, a member secured to one end of said shaft so as to lie in one of said compartments, a contact mounted on said member, a fixed contact secured to the adjacent wall of said housing in a position to be engaged by the contact on said member when in circuit closed position, means engaging the other end of said shaft and lying in the other compartment for urging said member to contact disengaging position, said contacts having face to face engagement and locking said member in circuit closed position, and means housed in said member for withdrawing the contact thereon from locking engagement with said fixed contact.

15. In a circuit breaker of the type described, the combination including a housing forming a chamber and a wall dividing said chamber into two compartments, a shaft journaled in said wall and projecting into each compartment, a member secured to one end of said shaft so as to lie in one of said compartments, a contact mounted on said member, a fixed contact secured to the adjacent wall of said housing in a position to be engaged by the contact on said member when in circuit closed position, means engaging the other end of said shaft and lying in the other compartment for urging said member to contact disengaging position, said contacts having face to face engagement and locking said member in circuit closed position, and means housed in said member for withdrawing the contact thereon from locking engagement with said fixed contact, the wall of the compartment in which said member lies being curved and the adjacent portion of said member being curved and positioned close thereto whereby in circuit opening movement of said member the contact thereon moves in a very restricted arcuate chamber.

16. In a circuit breaker of the type described, the combination including a housing forming a chamber and a wall dividing said chamber into two compartments, a shaft journaled in said wall and projecting into each compartment, a member secured to one end of said shaft so as to lie in one of said compartments, a contact mounted on said member, a fixed contact secured to the adjacent wall of said housing in a position to be engaged by the contact on said member when in circuit closed position, means engaging the other end of said shaft and lying in the other compartment for urging said member to contact disengaging position, said contacts having face to face engagement and locking said member in circuit closed position, and means housed in said member for withdrawing the contact thereon from locking engagement with said fixed contact, the wall of the compartment in which said member lies being curved and the adjacent portion of said member being curved and positioned close thereto whereby in circuit opening movement of said member the contact thereon moves in a very restricted arcuate chamber, said housing having a plurality of serially communicating chambers communicating at one end with the compartment in which said member lies and at the other end with the open air.

17. In a circuit breaker as described, the combination including a housing, a member journaled in said housing for oscillation about a pivot point, a toggle linkage mounted on said member and including a contact slidably mounted along a chord of the arc of oscillation of said member, a contact fixed on an inner wall of said housing in a position to be engaged by the contact on said member when in circuit closed position, and when the members of the toggle linkage are in a straight line, means for urging said member to contact disengaging position, and means mounted in said member for urging the members of the toggle linkage out of straight line position upon the development of an overload, said contacts when in engagement locking said member in circuit closed position against the resistance of said means.

18. In a circuit breaker as described, the combination including a housing, a member journaled in said housing for oscillation about a pivot point, a toggle linkage mounted on said member and including a contact slidably mounted along a chord of the arc of oscillation of said member, a contact fixed on an inner wall of said housing in a position to be engaged by the contact on said member when in circuit closed position and when the members of the toggle linkage are in a straight line, means for urging said member to contact disengaging position, means mounted in said member for urging the members of the toggle linkage out of straight line position upon the development of an overload, said contacts when in engagement locking said member in circuit closed position against the resistance of said means, and manual means for moving said member to contact engaging position.

19. In a circuit breaker as described, the combination including a housing, a member journaled in said housing for oscillation about a pivot point, a toggle linkage mounted on said member and including a contact slidably mounted along a chord of the arc of oscillation of said member, a contact fixed on an inner wall of said housing in a position to be engaged by the contact on said member when in circuit closed position and when the members of the toggle linkage are in a straight line, means for urging said member to contact disengaging position, means mounted in said member for urging the members of the toggle linkage out of straight line position upon the development of an overload, said contacts when in engagement locking said member in circuit closed position against the resistance of said means, manual means for moving said member to contact engaging position, and means including fixed and movable contacts controlled by said manual means and included in the circuit with said first contacts for interrupting the circuit thereto until in locked engagement.

20. In a circuit breaker as described, the combination including a housing, a member journaled in said housing for oscillation about a pivot point, a toggle linkage mounted on said member and including a contact slidably mounted along a chord of the arc of oscillation of said member, a contact fixed on an inner wall of said housing in a position to be engaged by the contact on said member when in circuit closed position and when the members of the toggle linkage are in a straight line, means for urging said member to contact disengaging position, means mounted in said member for urging the members of the toggle linkage out of straight line position upon the development of an overload, said contacts when in engagement locking said member in circuit closed position against the resistance of said means, manual means for moving said member to contact engaging position, and means operated by said manual means for moving the members of the toggle linkage out of straight line position to destroy the linkage engagement of said contacts at will.

21. In a circuit breaker, a housing having a fixed contact therein, a member oscillatably journaled in said housing, a contact secured on said member, means in said housing for urging said member to contact disengaging position, an actuator external of said housing for moving said member to contact engaging position, the contact on said member and the fixed contact when in engagement locking said member against contact disengaging movement, and means on said member for causing the contact thereon to move sufficiently relatively to the fixed contact to remove the locking engagement therebetween upon an overload.

22. In a circuit breaker, a housing having a fixed contact therein, a member oscillatably journaled in said housing, a contact secured on said member, means in said housing for urging said member to contact disengaging position, an actuator external of said housing for moving said member to contact engaging position, the contact on said member and the fixed contact when in engagement locking said member against contact disengaging movement, and thermostatic means on said member for causing the contact thereon to move sufficiently relatively to the fixed contact to remove the locking engagement therebetween upon an overload.

23. In a circuit breaker, a housing having a fixed contact therein, a member oscillatably journaled in said housing having a contact thereon, said contacts having flat engaging faces, means for urging said member to contact disengaging position, an actuator for moving said member to contact engaging position, the flat faces of said contacts when in engagement locking the member against contact disengaging movement, heat responsive means in circuit with said contacts for moving the contact on said member from locking engagement with the fixed contact, and means operated by the actuator for moving the contact on said member to remove its locking engagement with the fixed contact.

24. In a circuit breaker, a housing having a fixed contact therein, a member oscillatably journaled in said housing having a contact thereon, said contacts having flat engaging faces, means for urging said member to contact disengaging position, an actuator for moving said member to contact engaging position, the flat faces of said contacts when in engagement locking the member against contact disengaging movement, heat responsive means in circuit with said contacts for moving the contact on said member from locking engagement with the fixed contact, and means operated by the actuator for moving the contact on said member to remove its locknig engagement with the fixed contact, said member and the adjacent inner wall of the housing being curved and closely spaced at the path of movement of the contact on said member as it moves from closed circuit position to open circuit position, to restrict the space in which an arc may form between said contacts.

25. In a circuit breaker, a housing forming a chamber having a curved inner wall, a fixed contact mounted therein at one end of said curved wall, a member journaled for oscillation in said housing having a substantially curved wall positioned closely adjacent to the curved wall of the housing, a contact slidably mounted on said member, means for urging said member to contact disengaging position, means for moving said member to contact engaging position, the contact on said member engaging the fixed contact to lock the member in circuit closed position, the contact on said member moving in the very restricted arcuate chamber between the member and the curved wall of the housing during opening circuit movement, and means housed in said member for moving the contact on said member from locking engagement with the fixed contact upon the development of an overload in a circuit to which the breaker is connected.

26. In a circuit breaker as described, the combination comprising a housing forming a chamber, a cylindrical member oscillatable about a fixed axis in said chamber, said member forming a compartment, a contact fixed on the wall of said housing, a contact slidably mounted in said member so as to project through an aperture in the wall thereof and positioned to engage the fixed contact in circuit closing position of said member, means for urging said member to contact disengaging position, manual means for moving said member to circuit closed position and for moving the contact on said member into engagement with the fixed contact, the engagement of said contacts holding said member in circuit closed position, and thermostatic means in said member for moving the contact on said member away from said fixed contact to destroy its locking engagement therewith upon development of an overload in a circuit connected thereto.

27. In a circuit breaker as described, the combination comprising a housing forming a chamber, a cylindrical member oscillatable about a fixed axis in said chamber, said member forming a compartment, a contact fixed on the wall of said housing, a contact slidably mounted in said member so as to project through an aperture in the wall thereof and positioned to engage the fixed contact in circuit closing position of said member, means for urging said member to contact disengaging position, manual means for moving said member to circuit closed position and for moving the contact on said member into engagement with the fixed contact, the engagement of said contacts holding said member in circuit closed position, thermostatic means in said member for moving the contact on said member away from said fixed contact to destroy its locking engagement therewith upon development of an overload in a circuit connected thereto, and means actuated by said manual means for moving the contact on said member to cause unlocking disengagement with respect to the fixed contact.

28. In a circuit breaker as described, the combination including a housing forming a chamber, a member in said chamber supported for oscillation on a fixed axis therein, a contact mounted on said member for movement with respect thereto, heat responsive means mounted on said member and connected to said contact for moving it with respect to said member, a fixed contact secured in the chamber of said housing in a position to be engaged by the contact on said member in the circuit closed position of said member, means connected to said member for continuously urging it to contact disengaging position, and manual means for moving said member to circuit closed position, said fixed contact being positioned with respect to the contact on said member so that in circuit closed position said means for urging said member to open circuit position causes a wedging engagement between said contacts to lock said member in circuit closed position.

29. In a circuit breaker, a housing having a fixed contact thereon, a member journaled for oscillation in said housing having a contact thereon, said contact being movable on said member along a line offset from the axis of oscillation of said member, means for urging the member to contact disengaging position, and an actuator for moving the member to contact engaging position, the contact on said member when in engagement with the fixed contact locking the member in corresponding position against contact disengaging movement.

30. In a circuit breaker, a housing having a fixed contact therein, a member journaled in said housing, a contact mounted for longitudinal sliding movement on said member along a line spaced from the journal axis of said member, a toggle mechanism on said member for effecting said linear movement of the member contact, means connected to the member for urging it to contact engaging position, means for actuating the member to contact engaging position, said member contact locking the member in "on" position against contact disengaging movement, and means on said member for causing the contact thereon to move sufficiently relatively to the member to remove the locking engagement therebetween when the toggle mechanism is aligned.

31. In a circuit breaker, a housing having a fixed contact therein, a member journaled in said housing, a contact mounted for longitudinal sliding movement on said member along a line spaced from the journal axis of said member, a toggle mechanism on said member for effecting said linear movement of the member contact, means connected to the member for urging it to contact engaging position, means for actuating the member to contact engaging position, said member contact locking the member in "on" position against contact disengaging movement, means on said member for causing the contact thereon to move sufficiently relatively to the member to remove the locking engagement therebetween when the toggle mechanism is aligned, and means for moving the toggle mechanism out of alignment to release the member.

JAMES H. BURNSIDE, 2nd.